Figure 1:
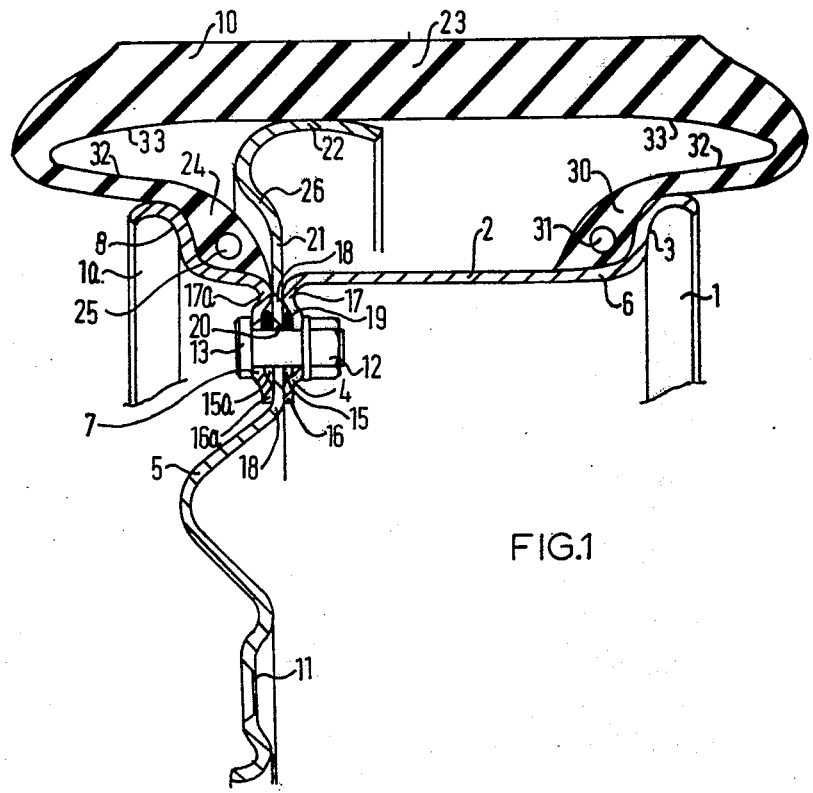

United States Patent [19]

Mitchell et al.

[11] 3,968,825
[45] July 13, 1976

[54] VEHICLE WHEELS

[75] Inventors: William Eric Mitchell, Coventry; Reginald Harold Edwards, Sutton Coldfield, both of England

[73] Assignee: Dunlop Limited, London, England

[22] Filed: Aug. 29, 1973

[21] Appl. No.: 392,558

[30] Foreign Application Priority Data

Sept. 8, 1972 United Kingdom............... 41693/72
Mar. 3, 1973 United Kingdom............... 10444/73

[52] U.S. Cl.............................. 152/158; 152/396
[51] Int. Cl.²......................................... B60C 5/00
[58] Field of Search........... 152/158, 396, 397, 398, 152/381; 301/38

[56] References Cited
UNITED STATES PATENTS

| | | | |
|---|---|---|---|
| 2,045,341 | 6/1936 | Bourdon | 152/158 X |
| 2,165,810 | 7/1939 | Paselk | 152/158 |
| 2,989,108 | 6/1961 | Gore | 152/158 |
| 3,028,900 | 4/1962 | Scott | 152/158 |
| 3,135,556 | 6/1964 | Lindley | 152/158 X |
| 3,288,193 | 11/1966 | Mantzel | 152/158 X |

FOREIGN PATENTS OR APPLICATIONS 972,486 7/1949 Germany
691,001 5/1953 United Kingdom............... 152/158
1,359,461 7/1974 United Kingdom............... 152/158

*Primary Examiner*—Allen N. Knowles
*Attorney, Agent, or Firm*—Stevens, Davis, Miller & Mosher

[57] ABSTRACT

A pneumatic tire and vehicle wheel assembly, the wheel being of the split-rim type without a tire mounting well in the base portion of the rim. A support member is provided extending radially from the base portion of the rim to contact and support the tread region of the tire when the tire is wholly or partially deflated. The support member is preferably of L-section so as to have a cantilever flange to contact the tire and is preferably heat-conductive. A lubricant is preferably included in the tire cavity which will be between the tire and support member when the former contacts the latter. The support member is preferably adjacent one of the bead seats of the rim to serve the secondary purpose of retaining the tire bead on said seat. The support member may be an integral, radially outer part of the wheel disc or a separate, annular component surrounding the base portion of the rim.

1 Claim, 2 Drawing Figures

VEHICLE WHEELS

This invention relates to the assembly of a pneumatic tire and a vehicle wheel.

When a conventional tire and wheel assembly is used in the deflated state it is well known that the interior surfaces of the pneumatic tire come into contact with each other causing a rapid rise in temperature and the subsequent structural failure of the tire. Furthermore a lose of steering control often occurs due to the axially inward displacement of the beads of the tire from their normal bead seats.

It is an object of this invention to provide an improved means for preventing the opposite faces of a deflated pneumatic tire from coming into contact with one another.

According to one aspect of the present invention there is provided the assembly of a pneumatic tire and a vehicle wheel, the tire comprises tread and sidewall portions and bead portions at the radially inner peripheries of the sidewall portions, and a wheel comprising a disc and a rim, the rim comprising a pair of bead seat portions on which the beads of the tire are respectively located, a pair of bead support flanges on the axially outer sides of the bead seat portions and extending radially beyond the bead seat portions adjacent the axially outer sides of the tire beads and a well-less base portion between said bead seat portions, the base portion being of diameter such as to prevent mounting and dismounting of the tire from the rim and the rim being in two parts separable in the base portion for tire mounting and dismounting, the disc having an integral radially outer portion forming a tire support member which extends into the tire cavity radially beyond the bead support flanges of the rim and which support member is adapted to contact and support the tread portion of the tire if the latter is partially or wholly deflated, the two parts of the rim being releasably connected together and to the disc on opposite sides of the latter so that the tire support member extends through the well-less base portion of the rim.

Preferably a tire support flange is provided extending generally axially of the rim from the radially outer periphery of the disc so that the tire support portion of the disc within the tire cavity is generally L-shaped in cross-section.

According to another aspect of the invention there is provided the assembly of a pneumatic tire and a vehicle wheel, the tire comprising tread and sidewall portions and bead portions at the radially inner peripheries of the sidewall portions, and the wheel comprising a disc and a rim, the rim comprising a pair of bead seat portions on which the beads of the tire are respectively seated, a pair of bead support flanges on the axially outer sides of the bead seat portions and extending radially beyond the bead seat portions adjacent the axially outer sides of the tire beads, and a well-less base portion between said bead seat portions, the rim comprising two parts separable in a diametral plane between the bead seat portions to permit tire mounting and dismounting and the base portion being of diameter such as to prevent mounting and dismounting of the tire from the rim without separation of the parts thereof, there being additionally provided an annular tire support member extending radially outwardly of the base portion of the rim between the bead seat portions and an annular tire support flange connected at one of its axial ends to the radially outer end of said member to extend from said member in cantilever fashion generally parallel with the rim axis at a position radially beyond the radially outer ends of the bead support flanges and spaced from the interior of the tire when the latter is in a normal state of inflation, said support flange being arranged to engage and support the tread portion of the tire if the latter is wholly or partially deflated and there being provided inside the tire cavity between the tire and rim a lubricant which will interpose itself between said support flange and the tire when the tread portion of the tire is engaged and supported by said support flange. The support flange is preferably of heat conductive material and the support member is preferably of heat conductive material.

Said support flange is preferably curved in longitudinal section so as to be convex towards the tire tread region.

The radially outer periphery of said member preferably joins the said one end of said support flange over a curve which is convex toward the tire tread region.

Said member preferably extends from the base portion of the rim adjacent one of said bead seat portions thereby to serve to prevent displacement from the latter of the tire bead seated thereon.

Said member is preferably shaped approximately to follow the contour of the adjacent tire bead.

Said support member and support flange are preferably formed integrally from sheet steel.

Said support member may be an integral, radially outer portion of the wheel disc, said parts of the rim being releasably connected to opposite sides of said disc intermediate the radially inner and radially outer peripheries of the disc.

Alternatively said support member may have at its radially inner periphery an axially-extending foot portion which surrounds the base portion of the rim. In this construction the two parts of the rim are preferably separable adjacent one of the bead seat portions thereof, the base portion of the rim being formed in the part which comprises the other of said bead seat portions and having intermediate its ends a deformation against which the foot of the support member is locatable to prevent displacement of the support member axially of the base portion between said deformation and the tire bead on said one bead seat portion.

Figure 2:
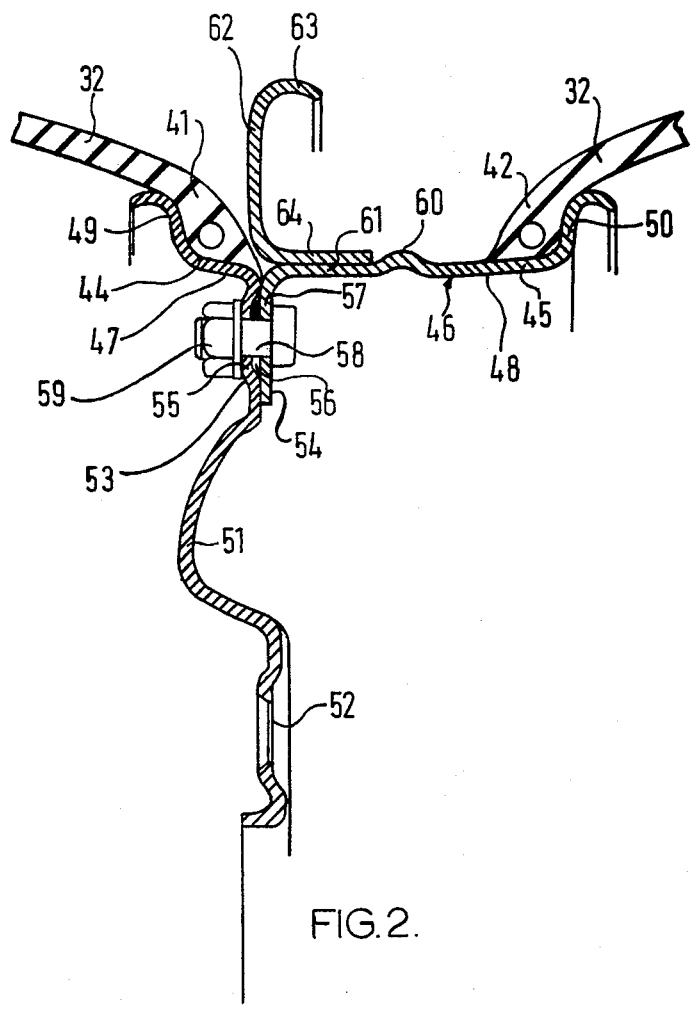

The invention will now be described by way of example only with reference to the accompanying drawings in which FIGS. 1 and 2 are similar cross-sectional views of alternative pneumatic tire and vehicle wheel assemblies in accordance with the invention.

The wheel assembly shown in FIG. 1 comprises a two-part divided rim 1 and 1a attached to a disc portion 5 and having a pneumatic tire 10 mounted thereon. The first rim part 1 comprises a flat rim base 2 and tire bead seat portion 6 for a tire bead 30 incorporating an inextensible bead wire 31, a tire bead retention flange 3 being positioned on the axially outer extremity of this part 1 and a radially inwardly extending attachment flange 4 being positioned at its inner extremity. The second rim part 1a comprises a radially inwardly turned attachment flnge 7, a tire bead retaining flange 8 and a tire bead seat 9 positioned between the two flanges to accommodate the other bead 24 incorporating an inextensible bead wire 25. The disc portion 5, having conventional wheel/stud location apertures 11, is positioned between the attachment flanges 4 and 7 of the rim parts 1 and 1a on the outboard side of the rim leaving a space bounded by the flat rim base 2 on the inboard side of the wheel to accommodate brake components. The two rim portions 1 and 1a and the disc portion are detachably secured together by means of nuts 12 and bolts 13 positioned through apertures provided in an equally spaced-apart configuration around a common pitch circle.

The attachment flanges 4 and 7 are formed by a coining operation between dies to provide channels 15, 15a bounded on their radially inner side by circumferential ribs 16, 16a and on their radially outer sides by circumferential ribs 17, 17a and the ribs 16, 16a and 17, 17a forming circumferentially extending areas of contact with flange 18 of the disc portion 5 and thus determining the axial depth of the channels 15, 15a between flanges 18 and 7 and flanges 18 and 4. Two rubber O-rings 19 and 20 are fitted one within each of the channels 15, 15a between the flange 18 of the disc 5 and the attachment flanges 4 and 7. The O-rings 19 and 20 are fitted under slight tension around each bolt 12 in a polygonal configuration to act as an air-tight seal between the rim portions 1 and 1a and the disc 5 substantially as described in greater detail in applicant's co-pending Application S.N. 370,707 of June 18, 1973.

The disc 5 also comprises an integral circumferentially extending tread support member 21 which is arranged to extend radially outwardly of the rim into the tire cavity and has at its radially outer periphery an axially directed support flange 22 which affords an extended substantially cylindrical engagement surface parallel with the rim axis which acts as a support for the inner surface of the tread portions 23 of the pneumatic tire 10 when wholly or partially deflated. The support member 21 is bent axially outwardly at 26 so that it is shaped to follow approximately the profile of tire bead 24 and the support member 21 is positioned to prevent axially inward displacement of the bead 24.

When the tire is in the deflated condition the tread 23 is supported with some flexibility by the cantilever flange 22. The support thus provided allows the tire 10 to assume a low profile and prevents the walls 32 of the tire 10 from being compressed to the extent that contact takes place between the inner surface of the tread portion 33 and the sidewalls 32. By avoiding the rubber-to-rubber contact which otherwise takes place in this region in a delated tire the amount of frictional engagement between opposing surfaces and the resultant temperature rise are reduced thus reducing the ensuing structural damage to the tire. An important factor in reducing the frictional forces still further is the inclusion of a small quantity of a suitable lubricant in the tire cavity which will be interposed between the tread region of the tire and the tire support flange 22 when the latter contacts the tire. Examples of suitable lubricants are those disclosed in the assignee's U.S. Pat. No. 3,739,829 issued June 19, 1973 which are located in the tire cavity to line the inner surfaces of the tire so as to be interposed between the tread portion of the tire and the flange 22 when the latter is in contact with the former. The radially outwardly extending member 21 may be made of ay good thermal conductor such as steel (in which case its thermal conductivity will be in the region of 0.05 kilojoules meter per meter$^2$ per second per degree Kelvin). When the tire contacts the axially extending flange 22 the frictional heat generated is conducted away from the rubber by the flange 22 and member 21 and is transferred to the rim and disc assembly which in turn is cooled by the air current generated by the wheel in motion.

The radial height of the member 21 above the rim base 2 may be varied to suit the profile requirements of the tire though the axially inwardly extending flange 22 is arranged to extend radially beyond the tire bead retention flanges 8 and 3.

The curved cross-sectional shape of the flange 22 reduces the possibility of damage to the tire, and the cantilever connection of one said end of flange 22 to the member 21 provides a degree of resilience which is also useful in avoiding damage to the tire.

The pneumatic tire and wheel assembly shown in FIG. 2 comprises a pair of tire beads 41 and 42, forming part of a pneumatic tire 32, which are mounted on bed seats 44 and 45 of a divided-type rim assembly 46. The rim assembly 46 comprises rim parts 47 and 48 having tire bead retaining flanges 49 and 50 respectively.

The outboard rim portion 47 extends integrally with a wheel disc portion 51 having the normal fixing holes 52 which are engageable with conventional studs to secure the wheel to a hub. The outer peripheral portion of the wheel disc 51 forms an annular attachment flange 53 by which the rim portion 47 is secured to a corresponding radially inwardly turned attachment flange 54 formed on the rim portion 48. A circumferentially-extending recess 55 in the attachment flange 53 provides a channel 56 in which a rubber sealing ring 57 is arranged as described in the specification of the applicant's co-pending U.S. Patent Application No. 370,707. In this arrangement, the sealing ring 17 takes up a polygonal configuration as viewed in the axial direction, passing around the radially outer surfaces of the shank portions of a series of securing studs 58 which pass through the flanges 53 and 54 and engage nuts 59 to hold the flanges together.

The inboard rim portion 48 is deformed in its central region with a circumferentially-extending hump 60, the rim portion 48 having a cylindrical portion 61 which extends from the hump 60 to the attachment flange portion 54. An annular tread support flange 62 is of generally C-shaped cross-section taken in a plane containing the axis of the flange and has a rounded radially outer portion 63 which extends axially to present a convex profile for engagement with the tread region of a deflated tire. The radially inner foot portion 64 of the flange 62 is arranged to fit closely but slidably around the portion 61 of the rim portion 48.

In assembling the tire 32 on to the rim assembly 46, the flange 62 is inserted into the tire 32, the bead 42 is then mounted on the rim portion 48, and the flange 62 is then slid into telescoping relationship around the portion 61 of the rim portion 48. The rim portion 47 is then brought into engagement with the tire bead 32, the sealing ring 57 having been fitted around securing studs 58 already in position in the attachment flange 54 of the rim portion 48, and the rim portions are secured together by means of the studs 58 and nuts 59. The tire is then inflated, for example through a valve (not shown) positioned in the channel 56 as described in the applicant's co-pending U.S. Patent application No. 307,707.

A quantity of a lubricant for example of the kind disclosed in U.S. Pat. No. 3,739,829 is provided in the tire cavity so that it will interpose itself between the tread region of the tire and the outer portion 63 of the support flange 62 when the partially or wholly deflated tire is supported by the flange 62. The lubricant fluid may be enclosed in a container arranged to release the lubricant upon deflation or partial deflation of the tire. Alternatively the lubricant may be free within the tire cavity at all times, or may be in the form of a gel coating interior surfaces of the tire, especially in the tread region.

In normal running, the support member 62 takes no part in supporting the tire, but when a puncture occurs the rounded and lubricated support flange serves to prevent the tire from complete collapse and thus prevents excessive heat build-up from hysteresis in the tire sidewalls. The member 62 also acts to secure the outboard bead 41 of the tire in position. Despite the lubricant, some heat is generated during the deflated running of the tire and this is conducted through the member 62, which has a thermal conductivity (in the case of a steel member) in the region of 0.05 Kilojoules-meter per meter$^2$ per second per degree Kelvin. The heat conducted through the member 62 is transferred to the rim and disc assembly which in turn is cooled by the air current generated by the wheel in motion.

The radial height of the flange 63 above the base of the rim may be varied to suit the profile of the tire 32 but it is arranged to extend radially outwardly beyond the tire bead retaining flanges 49 and 50.

It is to be noted that in each of the embodiments described, the base 2 or 48 of the rim is of generally flat configuration in cross-section and is of diameter such that the associated tire cannot be dismounted or mounted without separating the two parts of the rim. The rim is therefore formed without the "well" in its base portion which is necessary for this purpose in a one-piece rim.

Having now described our invention, what we claim is:

1. The assembly of a pneumatic tire and a vehicle wheel, the tire comprising tread and sidewall portions and bead portions at the radially inner peripheries of the sidewall portions; the wheel comprising a disc and a rim, the rim comprising a pair of bead seat portions on which the beads of the tire are respectively seated, a pair of bead support flanges on the axially outer sides of and integral with the bead seat portions and extending radially beyond the bead seat portions adjacent the axially outer sides of the tire beads; a well-less base portion between said bead seat portions, the rim comprising two parts separable in a diametral plane between the bead seat portions to permit tire mounting and dismounting with the base portion being of diameter such as to prevent mounting and dismounting of the tire from the rim without separation of the parts thereof, an annular tire support member separably surrounding the base portion of the rim, said support member comprising a foot portion extending axially of the rim in contact with the base portion, a web portion extending radially outwardly of the base portion of the rim from one end of the foot portion and an annular tire support flange connected at one of its axial ends to the radially outer end of said web portion to extend from said web portion in cantilever fashion generally parallel with the rim axis at a position radially beyond the radially outer ends of the bed support flanges and spaced from the interior of the tire when the latter is in a normal state of inflation, said support flange being positioned to engage and support the inner surface of the tread portion of the tire when the latter is wholly or partially deflated, the two parts of the rim being separable adjacent one of the bead seat portions thereof, the base portion of the rim being formed in the part which comprises the other of said bead seat portions and having intermediate its ends a deformation against which the foot of the support member is locatable to prevent displacement of the support member axially of the base portion between said deformation and the tire bead on said one bead seat portion.

* * * * *